2,715,072
Patented Aug. 9, 1955

2,715,072

DRYING OIL COMPOSITION

Joseph A. Chenicek, Bensenville, and Robert H. Rosenwald, Western Springs, Ill., assignors to Universal Oil Products Company, Chicago, Ill., a corporation of Delaware No Drawing. Application March 26, 1949,
Serial No. 83,753

3 Claims. (Cl. 106—263)

This invention relates to a drying oil composition and more particularly to a novel drying oil composition containing an additive to retard the tendency of such oils to form an undesirable skin on the surface thereof when stored.

It is generally recognized that drying oils when stored en masse for prolonged periods, especially in contact with an atmosphere of limited oxygen content in many cases form an undesirable skin at the surface of the oil. It is believed that this undesirable skin results at least in part from oxidative reactions. Regardless of the cause of such skinning, the formation of a tough, relatively insoluble skin interferes with the ready use of the drying oil, and the present invention is directed to a novel composition and to a novel method of retarding such undesirable skin formation.

In one of its embodiments, the present invention relates to a novel drying oil composition comprising a drying oil and a 2-alkyl-4-alkoxyphenol.

A specific embodiment of the present invention relates to a drying oil composition comprising linseed oil and 2-tertiary-butyl-4-methoxyphenol.

The present invention is applicable to the treatment of any drying oil which undergoes undesirable skin formation. In general, these drying oils may be comprised as one or a mixture of components selected from the unsaturated fatty acids, the unsaturated fatty acid esters, terpene hydrocarbons which contain unsaturated linkages in their cyclic structure, etc. The above represent typical illustrations of drying oils obtained from naturally occurring sources and may be utilized in the present composition in their "as recovered" condition or after suitable treatment such as bodying, dehydration, etc. These drying oils are generally of vegetable origin and include such typical examples as linseed oil, castor oil, walnut oil, tung oil, oiticica oil, etc.

The present invention is also applicable to the treatment of synthetic drying oils, including those recovered from catalyst-hydrocarbon sludges formed in a conjunct polymerization reaction, such as a hydrogen fluoride sludge formed by the reaction of substantially anhydrous hydrogen fluoride with an unsaturated hydrocarbon at conjunct polymerization reaction conditions. Recovery is effected from the sludge formed thereby, either by means of thermal decomposition or by hydrolytic decomposition of the catalyst-hydrocarbon complexes contained in said sludge. Other synthetic drying oils are prepared by cobodying unsaturated fatty acid esters with unsaturated hydrocarbons, either thermally or in the presence of a suitable catalyst, such as phosphoric acid, a silica-alumina composite, etc. The preparation of synthetic drying oils, as well as the recovery and treatment of natural drying oils from vegetable and marine sources is well known in the art and requires no detailed description in the present application.

The 2-tertiary-butyl-4-alkoxyphenols are particularly suitable for use in drying oils as anti-skinning agents in accordance with the present invention. 2-tertiary-butyl-4-methoxyphenol is readily soluble in drying oils, does not impart undesirable color or odor to the drying oil and is of high potency in retarding skin formation in drying oils. Another important feature of the present anti-skinning agent is the fact that it does not interfere with the ready drying of the drying oil composition and does not impair the ultimate formation of a tack-free, abrasion-resistant coating. Further, it has been found that the present 2-tertiary-alkyl-4-alkoxyphenolic compounds do not interfere with the action of metallic driers commonly employed in coating compositions, usually selected from the oxides, naphthenates, oleates, resinates, etc., of such metals as cobalt, lead, manganese, etc.

In accordance with the present invention, a 2-alkyl-4-alkoxyphenol is composited with a drying oil normally tending to undergo skin formation, regardless of its source. Any suitable 2-alkyl-4-alkoxyphenol may be employed within the scope of the present invention. A particularly preferred 2-alkyl-4-alkoxyphenol is 2-tertiary-butyl-4-methoxyphenol. In general, the 2-alkyl-4-alkoxyphenols have the following general structure of formula:

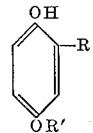

where R and R' are alkyl groups. Other preferred components include those in which R of the above general formula is a tertiary-alkyl group having from 4 to about 12 carbon atoms and R' is an alkyl group having not more than 4 carbon atoms per group. Suitable compounds within this class utilizable in the present drying oil composition as anti-skinning agents include 2-tertiary-amyl-4-methoxyphenol, 2-tertiary-hexyl-4-methoxyphenol, 2-tertiary-heptyl-4-methoxyphenol, 2-tertiary-octyl-4-methoxyphenol, 2-tertiary-butyl-4-ethoxyphenol, and other ethoxy, propoxy or butoxyphenols containing a tertiary alkyl group of 4 to about 12 carbon atoms. Also included are the 2,5-dialkyl-4-alkoxyphenols such as 2,5-ditertiary-butyl-4-methoxyphenol, as well as the mixture of these compounds with the 3-alkyl-4-alkoxyphenol formed during the alkylation reaction in the preparation of the 2-alkyl-4-alkoxyphenol.

The 2-tertiary-alkyl-4-alkoxyphenol is added to the drying oil is an amount which generally will be less than about 5% by weight of the drying oil and preferably within the range of from about 0.002% to about 2% by weight.

Preferably, the 2-alkyl-4-alkoxyphenol is composited with the drying oil as rapidly after preparation of the drying oil as practicable, in order to deter any initial tendency of the oil to undergo skin formation prior to use of the drying oil in paint, varnish, lacquers, etc. The drying oil will thus maintain its fluidity and consistency and will permit the ready use thereof for compositing with paint, varnish, lacquer and other coating composition components. However, when desired, the 2-tertiary-alkyl-4-alkoxyphenol may be added to the drying oil at any time in the preparative stage of the paint, varnish, etc., particularly prior to the packaging and storing of the coating composition where the latter is stored for a considerable time prior to its use.

The present invention is further illustrated with reference to the following example, which concerns the preparation of a drying oil composition and to the use of a specific 2-alkyl-4-alkoxyphenol as anti-skinning agent.

A bodied linseed oil was used as the drying oil component in this example. Two different samples of the latter drying oil containing 0.5% and 2% by weight of 2-tertiary-butyl-4-methoxyphenol were prepared by dissolving the phenol in the drying oil and the resulting samples were stored in wide mouthed jars with the lid set on the jar. In addition, a sample of the linseed oil without the addition of 2-tertiary-butyl-4-methoxyphenol was likewise stored under the same conditions. No skinning occurred in any of the samples after two weeks storage. To these samples, a paint drier consisting of the naphthenates of cobalt, lead and manganese were added to provide the following concentrations of metal:

| | Percent |
|---|---|
| Cobalt (as Co) | 0.023 |
| Manganese (as Mn) | 0.14 |
| Lead (as Pb) | 0.067 |

After 24 hours, skinning was evident in the sample not containing the 2-tertiary-butyl-4-methoxyphenol. The samples were inspected over a period of 3 weeks and the skin development was observed. After this time, the samples were spread on metal panels and their drying characteristics were determined. The results of these tests are given in the following table:

| Sample | Time After Addition of Drier | | | | | Film Characteristics | |
|---|---|---|---|---|---|---|---|
| | 1 Day | 2 Days | 5 Days | 2 Weeks | 3 Weeks | Initial Set, Days | Dust Set, Days |
| A | 2 | 3 | 3 | 4 | 4 | 1 | 1 |
| B | 0 | 0 | 1 | 1 | 1 | 1 | 1 |
| C | 0 | 0 | 1 | 1 | 1 | 1 | 1 |

Sample A—bodied linseed oil only.
Sample B—same with 0.5% by weight of 2-tertiary-butyl-4-methoxyphenol.
Sample C—same with 2% by weight 2-tertiary-butyl-4-methoxyphenol.

The formation of skin is described by the following designations:

0—No skin formed.
1—Very slight skin on part of surface.
2—Slight skin all across surface.
3—Medium skin all across surface.
4—Heavy skin all across surface.

It will be noted that the sample of linseed oil without 2-tertiary-butyl-4-methoxyphenol forms a slight skin across the entire surface after only one day in storage and a heavy skin across the entire surface after two weeks in storage. On the other hand, it will be noted that samples containing 2-tertiary-butyl-4-methoxyphenol were skin-free after two days in storage and formed only a very slight skin on only part of the surface even after three weeks of storage.

It will also be noted that the drying oil film samples containing 2-tertiary-butyl-4-methoxyphenol set within one day and were dust-free after one day of storage. The designation "dust-free" describes the condition of the surface of the drying oil film and indicates that dust particles did not adhere to the surface and could be readily blown or brushed off.

We claim as our invention:

1. A coating composition comprising a drying oil normally tending to form skin, a metallic drier and a retarder of skin formation comprising a 2-tertiary-alkyl-4-alkoxyphenol.

2. A coating composition comprising a drying oil normally tending to form skin, a metallic drier and a retarder of skin formation comprising a 2-tertiary-butyl-4-alkoxyphenol.

3. A coating composition comprising a drying oil normally tending to form skin, a metallic drier and a retarder of skin formation comprising 2-tertiary-butyl-4-methoxyphenol.

References Cited in the file of this patent

UNITED STATES PATENTS

| 1,948,582 | Hunt | Feb. 27, 1934 |
| 2,225,918 | Martin | Dec. 24, 1940 |
| 2,310,710 | Rosenwald et al. | Feb. 9, 1943 |